US007002584B2

(12) United States Patent
Saito

(10) Patent No.: US 7,002,584 B2
(45) Date of Patent: Feb. 21, 2006

(54) VIDEO INFORMATION PRODUCING DEVICE

(75) Inventor: Kenji Saito, Katano (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 302 days.

(21) Appl. No.: 10/399,235

(22) PCT Filed: Oct. 11, 2001

(86) PCT No.: PCT/JP01/09236

§ 371 (c)(1), (2), (4) Date: Apr. 14, 2003

(87) PCT Pub. No.: WO02/33660

PCT Pub. Date: Apr. 25, 2002

(65) Prior Publication Data

US 2004/0027353 A1 Feb. 12, 2004

(30) Foreign Application Priority Data

Oct. 20, 2000 (JP) ............................ 2000-321117

(51) Int. Cl.
*G06T 15/00* (2006.01)

(52) U.S. Cl. ........................ 345/473; 345/419; 463/32

(58) Field of Classification Search ................ 345/473, 345/474, 475, 419; 463/32, 36
See application file for complete search history.

(56) References Cited

U.S. PATENT DOCUMENTS

| | | | | |
|---|---|---|---|---|
| 6,031,549 | A * | 2/2000 | Hayes-Roth | 345/474 |
| 6,040,841 | A * | 3/2000 | Cohen et al. | 345/473 |
| 6,245,982 | B1 * | 6/2001 | Suzuki et al. | 84/477 R |
| 6,322,448 | B1 * | 11/2001 | Kaku et al. | 463/32 |
| 6,359,622 | B1 * | 3/2002 | Hayes-Roth | 345/474 |
| 6,466,213 | B1 * | 10/2002 | Bickmore et al. | 345/473 |
| 6,503,086 | B1 * | 1/2003 | Golubov | 434/247 |
| 6,522,332 | B1 * | 2/2003 | Lanciault et al. | 345/473 |
| 6,554,706 | B1 * | 4/2003 | Kim et al. | 463/36 |
| 6,570,555 | B1 * | 5/2003 | Prevost et al. | 345/156 |
| 6,608,624 | B1 * | 8/2003 | Wang | 345/473 |

* cited by examiner

*Primary Examiner*—Phu K. Nguyen
(74) *Attorney, Agent, or Firm*—McDermott Will & Emery LLP

(57) ABSTRACT

An video information producing device comprising an input device for inputting 3-D image information of a real image, and a processing device for processing 3-D image information from the input device, the processing device having a function of storing real-image 3-D image information and a function of giving motions to real-image 3-D image information read from the storing function by applying an image processing technique to generate moving image information.

12 Claims, 6 Drawing Sheets

VIDEO INFORMATION PRODUCING DEVICE

TECHNICAL FIELD

The present invention relates to a video information producing device for producing a moving image by the computer graphics technology.

BACKGROUND ART

A video information producing device for producing a moving image by the computer graphics (CG) technology finds wide applications in the movie industry and the commercial message sector. Especially in the movie industry, the time has already come when the CG technology is indispensable for the most advanced movies in which animals created by the CG technology play a principal role and men grow into robots.

Technological elements of the CG include the creation of a three-dimensional object (called modeling), taking a picture of a three-dimensional object by radiating light on a particular object (called rendering) and the creation of a moving image (called animation).

Modeling includes detailed techniques such as texture mapping for dressing a three-dimensional object and furring for attaching fur of an animal.

The modeling work is to observe a three-dimensional object being rendered and correct any nonconforming points. For an animal in motion, a skeleton is determined and an image is produced with fixed joints and movable bones moved little by little. The resulting image is stored to produce a screen for objective movement. In order to change complicated movements into natural ones, a measuring instrument for measuring the position of the joints is worn by a man in motion thereby to obtain the data on the movement of the joints (motion capture step).

In the case of a comic, parts concerning the moving image information are prepared by the input work. It is a feature of CG that even a world not actually existent can be expressed.

The foregoing is an outline of the CG technologies explained in such a reference as "Fundamental Knowledge of Computer Graphics", by Atsushi Shiokawa, published by Ohm. The CG technologies thus have already found practical applications.

Parts for making up a moving image consist of movable parts and immovable background parts. In the conventional CG technology for producing a moving image, both the movable parts and the background parts are prepared manually by operators as three-dimensional image information using the computer. This job requires a high-speed computer and a great amount of labor in view of the need of producing moving images one by one.

Also, with regard to real objects such as actual men, animals, trees, houses, mountains, rivers and commodities, the CG technology is still in its infant stage as the three-dimensional image information thereof are still handled as a moving part or a background part. In other words, the technologies for handling real objects as freely movable parts have yet to be completed.

Accordingly, the primary object of the invention is to provide a video information producing device which can be used with a low-speed image information production device such as an inexpensive personal computer to produce CG moving images and especially to handle the three-dimensional image information on real objects as a moving part or a background part, thereby making it possible to develop the CG technologies further while at the same time reducing the cost of program production.

DISCLOSURE OF THE INVENTION (1) With the video information producing device according to this invention, the object described above can be achieved by introducing the following functions. Prior to the explanation of the functions, the terms used herein will be described. The real image is defined as an image of a real object which has an infinite variety of types.

A moving image can be divided into moving objects, immovable, stationary objects and a background. The immovable stationary objects can be grouped into backgrounds. Images of the moving objects constituting real parts and backgrounds photographed or imaged from a plurality of directions at the same time are real-image three-dimensional image information, which are called moving parts and background parts, respectively. These objects can be handled by the image processing technology such as the computer graphics technology.

The video information producing device according to the invention uses an input device for the real-image three-dimensional image information making up a real part. The input device includes, for example, a no-contact three-dimensional digitizer and a three-dimensional laser shape measuring system.

These devices can capture the three-dimensional image information of a real part (object) into a processing device such as a computer. As an alternative, the three-dimensional image information can be produced from the photographic information taken from a plurality of angles of a real part.

This real-image three-dimensional image information can be input automatically, and therefore working labor can be saved. In the case where a background is really existent, the photographic imaging from a plurality of angles is all that is required, thereby reducing production cost of large props and location cost. The computer making up a processing device for inputting the real-image three-dimensional image information is generally a high-speed computer.

Also, the video information producing device according to the invention comprises a processing device for processing the real-image three-dimensional image information input by the input device described above.

The processing device has a storage function and a function of generating moving image information by attaching motions to the real-image three-dimensional image information read from the storage function using the computer graphics technology. This processing device with the moving image information generating function reads the real-image three-dimensional image information from the storage function, and attaches the desired motions to the real-image three-dimensional image information using the required image processing technology such as the computer graphics technology thereby to generate moving image information automatically.

A plurality of screens making up a moving image can be calculated and plotted by the processing device by handling a real image as three-dimensional image information. Therefore, the screens are not required to be plotted one by one, thereby saving a great amount of labor.

This makes it possible to automatically generate an image from various viewpoints based on the three-dimensional image information of parts by the processing device. The reason is that in spite of the movement of parts, all the images of a moving image configured of a plurality of screens indicating the movement can be generated from the same three-dimensional image information.

As described above, according to this invention, a moving image of a real object or a real person can be easily produced automatically using the computer graphics technology constituting an image processing technique. As a result, the following advantages can be obtained.

Take an entertainer as an example of a real man. Once the real-image three-dimensional image information of the entertainer is acquired in advance instead of causing the entertainer to make a performance, the real-image three-dimensional image information of the entertainer can be read at an arbitrary date and time and can be moved freely within a range of the image processing technique thereby to prepare the moving image information of required motions even in his/her absence. Actual performance of the entertainer is thus not required, so that his/her binding time can be reduced considerably for a lower production cost.

It is practically impossible for an actual entertainer to perform such a dangerous action as diving from a high place or such an unrealistic action as jumping over a wide river. In the case of the moving image information produced using the image processing technique based on the real-image three-dimensional image information of the entertainer, however, such a restriction is not imposed, so that the moving image information can be freely produced in any desired situation within limits of the computer graphics technology.

With regard to the background, the three-dimensional image information on an actual object is used and therefore large props are not required, thereby making possible considerable reduction in program production cost.

As described above, a video information producing device according to the invention comprises an input device for inputting real-image three-dimensional image information and a processing device such as a computer for processing the three-dimensional image information from the input device, wherein the processing device includes a storage function for storing the real-image three-dimensional image information input from the input device and a function of generating moving image information by attaching motions to the real-image three-dimensional image information read from the storage function using an image processing technique such as a computer graphics technique.

With this configuration, the real-image three-dimensional image information making up a real component part can be automatically input and therefore working labor can be reduced.

Also, desired motions can be added by a required computer graphics technique to the real-image three-dimensional image information read from the storage function thereby to generate the moving image information automatically.

With regard to real images, it is handled as three-dimensional image information and a plurality of screens making up a moving image can be calculated and plotted by a computer. For this reason, the screens are not required to be plotted one by one, and therefore a great amount of labor can be saved. With regard to backgrounds, on the other hand, the need of large props is eliminated, again contributing to considerable reduction in the program production cost.

(2) A video information producing device according to the invention comprises an input device for inputting real-image three-dimensional image information and a processing device for processing the three-dimensional image information from the input device, wherein the processing device includes an input function for inputting the real-image three-dimensional image information, a storage function for storing the real-image three-dimensional image information from the input device, a small image information generating function for generating small image information from the real-image three-dimensional image information read from the storage function, a storage function for storing the real-image three-dimensional image information and the small image information as associated with each other, a function of displaying a scene frame for three-dimensional space expression, a function of reading the small image information from the storage function and displaying the small image in the small image frame, a function of selecting the small image information in the small image frame on a screen and attaching by moving it to a desired position in the scene frame, the function of storing the information for arranging the attached small image in the scene frame in the scene frame, a function of correcting in the scene frame the mode of expression of the small image displayed within the scene frame, a function of changing in the scene frame the mode of operation of the small image displayed in the scene frame, a function of updating arrangement information of the small image after correction or change, a moving image information producing function for producing a series of temporal moving image information by calculating the motion change from the small image before change to the small image after change in the scene frame, and a function of storing the moving image information produced.

This invention deals with two types of three-dimensional image information of a part including detailed image information and simple image information.

The three-dimensional image information of a part is configured of the information on the position and color at a point on the surface of the part. Nevertheless, the color information may lack (monochromatic).

The detailed image information is described with a high density of surface points, while the simple image information has a surface-point density about one hundredth (one example) smaller and so is the information amount. Incidentally, these numerical values are only an example for reference and may assume an arbitrary value.

Although an image produced from the simple image information is rough, it should be possible to recognize a moving image. A screen is called a small image of a part in the case where an image as viewed from the front of the part (an example) is produced from the simple image information or a comic (an example) indicating the particular part is produced, and a number or a name unique to the part is attached to the screen. This small image is assumed to contain the information associated with the detailed image information or the simple image information of the part.

In a computer graphics production system having functions of modeling, ditigizing, rendering, etc. for example, small image information generated from real-image three-dimensional image information is displayed in a small image frame (called thumb nail display).

Normally, a plurality of pieces of small image information are displayed. A small image of the small image information displayed in the small image frame is selected by, say, the drag-and-drop operation and attached by being moved to a desired position in the scene frame. In the process, the position where the small image is attached is stored as arrangement information.

This job is repeated to form a provisional scene composed of a combination of a background and a moving object in the scene frame. The form of expression of the small image in the scene frame can be corrected to produce a better scene.

The correction includes fine adjustment of size, rotation, perspective and position upward, downward, leftward and rightward. Also, the form of motions of the small image can be changed. The form of motions includes "stand", "sit down", "lie down", "jump", "walk", "run", etc. With the correction or change, the arrangement information of the small image after particular correction or change, as the case may be, is updated.

In order to attach motions to a small image, the moving image information producing function is used to calculate the motion change from the small image before change to the small image after change in the scene frame and produce a temporal series of moving image information. The moving image information thus produced is stored.

In the foregoing described operation, a computer can calculate and plot a plurality of screens making up a moving image with the small image associated with the real-image three-dimensional image information as a really existing part. Thus, the screens need not be drawn one by one thereby to save the labor.

This is because an image can be generated automatically from various view points based on the three-dimensional image information of a part and even in the case where the part moves, all the images of the moving image made up of a plurality of screens indicating the movement can be generated from the three-dimensional image information.

Moving objects include men, animals, automobiles, etc. The modes of movement of men and animals are walking, running, etc. A motion corresponding to the mode of movement is defined and the moving motion is automatically drawn. In this way, the labor can be saved.

An unrealistic image of a part such as an entertainer jumping over a wide river can also be freely produced. The entertainer is not required to make a performance, and the binding time is short. Thus, the production cost is also reduced.

In the presence of a background, it is sufficient to take pictures from a plurality of angles, thereby making it possible to reduce the cost of fabricating large props and location.

According to a preferred embodiment of the invention, the moving image information producing function of the processing device includes a function of duplicating the scene frame with a small image attached thereon, a function of moving the small image in the duplicated scene frame internally of the scene frame, a function of designating the mode of the particular movement of the small image, a function of designating the motion time from the small image before duplication to the small image after duplication in the scene frame, and a function of controlling the production of the temporal series of moving image information associating with the motion change from the small image before duplication to the small image after duplication within the scene frame in such a manner as to produce the moving image information for the designated motion time.

According to this embodiment, after duplicating the scene frame with the small image attached thereon, the small image is moved within the particular duplicated scene frame.

Now, the information on the transition from the position of the small image in the original scene frame to the position thereof in the duplicated scene frame can be obtained. Also, the mode of movement for moving the small image is designated.

The mode of movement is defined as the form of motion such as "walk", "run", "fly", etc. The motion time from the small image before duplication to the small image after duplication is designated as a somewhat long time in the case where a relatively slow movement is desired and as a somewhat short time in the case where a relatively rapid movement is desired.

Upon preparation as described above, a temporal series of moving image information for motion change from the small image before duplication to the small image after duplication is produced. At the same time, the moving image information for the motion time designated in the mode of movement described above can be automatically produced.

According to another preferred embodiment of the invention, the processing device further includes a function of changing a visual field in the three-dimensional space in the duplicated scene frame and a function of controlling the production of the temporal series of moving image information relating to the motion change from the small image before duplication to the small image after duplication in such a manner as to produce the moving image information with the visual field changed.

This function makes it possible not only to produce the temporal series of moving image information with a single fixed visual field but also to produce dynamic moving image information with a movable visual field. Specifically, an moving image can be produced in a zoomed fashion.

According to still another preferred embodiment of the invention, the processing device further includes a function of changing a view point in the three-dimensional space in the duplicated scene frame and a function of controlling the production of a temporal series of the moving image information relating to the motion change from the small image before duplication to the small image after duplication with the view point changed.

The operation of this embodiment is as follows. The temporal series of moving image information can be produced either with the view point fixed at a point or dynamically by moving the view point. In other words, it is possible to produce the moving image information with the camera moved or the visual direction changed (panned).

According to yet another preferred embodiment of the invention, the processing device further includes a function of displaying a scene description frame for describing a scene of a scene frame in association with the particular scene frame, a function of displaying a speech frame for describing speech in the scene of the scene frame, and a function of attaching the speech described in the speech frame to a small image selected in the scene frame.

The operation of this embodiment is as follows. The outline of the procedure for producing a moving image program (movie, TV program, etc.) includes original work, script, performance/imaging, editing and post-production. The original work is an ordinary book written by an author. An original work which is either superior or has a feature is selected to plan the production of a moving image program.

Next, a script is prepared. The script is a description of the contents of the moving image program. Performers, scene construction, speech, etc. are described in detail. The script is configured mainly of a scene, scene description and speech of the performers as a combination (which is called a storyboard).

Generally, the storyboard is often prepared by a plurality of producers for each scene. A storyboard production tool is equipped with a function of combining or replacing a plurality of storyboards in a designated order for each scene. This function corresponds to editing work for program production.

In conventional program production, all scenes are imaged with the performers giving a performance.

According to this invention, in contrast, the three-dimensional image information of the performers is prepared on a processing device such as a computer, and the performance is created on the computer, thereby making it possible to produce a moving image. The speech can also be produced on the computer.

This invention is intended to produce storyboards or scripts easily using the computer. Also, the invention is intended to produce a moving image by describing the scene construction of storyboards in detail and designating the movement information between the storyboards.

In a scene description frame, a description is made as to what scene is involved in the corresponding scene frame. In a speech frame, on the other hand, the speech spoken in the corresponding scene frame is described. In order to associate the speech with a small image, the speech in the speech frame is attached on the small image in the scene frame.

The production of a storyboard is made possible by a low-speed computer such as a personal computer using the simple image information of a part. A storyboard is produced on the personal computer using the following tools.

The personal computer is supplied with the simple image information of the part required for producing a storyboard. A scene frame for indicating a scene, a small image frame for displaying a plurality of input small images, a scene description frame for describing the scene and a speech frame for inputting speech are displayed on a screen of the personal computer.

A symbol indicating a view point is displayed in the scene frame thereby to designate a standard visual field. A small-screen is selected and a small image is attached at an appropriate position in the scene frame by the drag-and-drop operation or the like.

By operating the mouse, the size and direction of the part are set. A scene is described by attaching a plurality of parts. The information including a program title, a scene name and a scene number is input in the scene description frame.

Speech is described in a speech column. For the speech, a speaker and time from the start of a particular scene to the start of the speech are designated. Also, if necessary, voices are automatically generated and a mouth of the corresponding part is moved in the same manner as if the speech is generated. Thus, one complete storyboard is produced.

As described above, a storyboard with a scene frame, a scene description frame and a speech frame associated with each other can be easily produced using the low-speed image information production device such as a personal computer making up a low-speed computer.

According to a further preferred embodiment of the invention, the computer further has a function of designating the timing of generating the speech described in the speech frame and a function of synthesizing and outputting voices of the corresponding speech at the designated timing.

The operation of this embodiment is as follows. With regard to the speech described in the storyboard, a small image of a speaker or the like is designated and associated with speech, while at the same time designating the timing, i.e. the period of time from the start of the particular scene to the start of the speech.

As required, the pronunciation mode of the voice of the speaker as associated with the small image or the order of making the speech is designated, and so is the time from the end of the preceding speech to the start of the current speech.

The voice of the corresponding speech is synthesized at the designated timing. In this way, the voice information for giving a speech is produced in a manner designated for a particular person while at the same time producing a moving image. In other words, the speech can be automatically generated from the storyboard.

Nevertheless, the voice information is not necessarily automatically generated as described above but may alternatively be produced by a method (dubbing) in which a voice entertainer speaks in accordance with the images as in the prior art. Also in this case, the cost is not so high and poses no special problem.

According to a still further preferred embodiment of the invention, the processing device further includes a control function for moving a small image indicating a mouth in the small image in the pronunciation form in synchronism with the output timing of the speech.

The operation of this embodiment is as follows. At the same time that a moving image is produced, the motion of automatically moving the mouth of a particular person in the same manner as if the speech described in the storyboard is pronounced is added automatically. Thus, an additional job for moving the mouth is eliminated.

In the way described above, a storyboard is completed.

According to a yet further preferred embodiment of the invention, the processing device further includes a function of collectively managing a plurality of storyboards each constituting the information describing one scene configured of a scene frame, a scene description frame and a speech frame.

A collection of a plurality of storyboards can be called a script. A plurality of storyboards corresponding to one program, for example, may be called a script or otherwise the script can be managed as a piece of effective video information.

According to another preferred embodiment of the invention, the processing device further includes a function of designating one of a plurality of the above-mentioned managed scripts describing a unit broadcast program configured of a plurality of storyboards and upon designation of a specific storyboard, displaying a moving image from the particular storyboard or in the absence of designation, displaying moving image information each from the beginning, and a function of outputting the voice information as required.

The operation of this embodiment is as follows. A script or a storyboard constituting a part of the script is designated, and a moving image described in the storyboard is generated and displayed or, if required, voices are generated and output from the particular part. Thus, the script can be previewed (confirmed by being reproduced).

For example, a moving image produced in compliance with a preview command can be viewed on the screen of the personal computer. This moving image is normally based on the simple image information. Though it has a rough screen, the contents of the moving image can be confirmed.

In any case of inconvenience, each scene is corrected, and the process of generating and previewing a moving image is repeated to obtain a complete one. In the case where the scene changes, a new scene is designated. Then, both of the scene frame and the scene name are erased, and a new scene can be input.

According to still another preferred embodiment of the invention, there is provided a video information producing device, wherein the processing device is further configured so that a high-speed image information production device and a low-speed image information production device collaborates with each other, the high-speed image information production device having a function of producing simple image information with image information partly deleted from real-image three-dimensional image information and transferring the data to the low-speed image information production device, the low-speed image information production device having a function of executing the process of each function in the simple image information transferred as data in the simple image information transferred thereto as data, producing a script based on the simple image information and transferring the data to the high-speed image information production device, the high-speed image information production device having a function of converting the script based on the simple image information transferred thereto as data into a script produced based on the real-image three-dimensional image information as detailed image information.

The operation of the embodiment will be described below. The high-speed image information production device such as a high-speed computer produces the simple image information, i.e. the information with image information partly deleted from the real-image three-dimensional image information indicating a person or the like or a background, and transfers the simple image information as data to the low-speed image information production device.

The low-speed image information production device, on the other hand, executes the process of each function described above in the simple image information transferred thereto as data, produces the script based on the simple image information and transfers the particular script as data to the high-speed computer.

The high-speed image information production device converts the script based on the simple image information transferred thereto as data into the script produced based on the real-image three-dimensional image information as detailed image information.

More specifically, the high-speed computer inputs the detailed image information of the parts required for producing the storyboard for the particular script.

The tool for producing the storyboard is operated in the same way on the high-speed computer. In response to a moving image production command, however, a moving image is produced according to the detailed image information of the parts.

The high-speed computer has no function of preview on the CRT screen but a function of display on a screen or a monitor TV for confirmation in the real environment.

In the presence of any inconvenience, the storyboard on the high-speed computer is corrected. For sad expression of an entertainer or other case requiring a delicate expression, the performance of the entertainer is actually imaged and input as a part (moving part) and attached on the storyboard. In this way, a real image can be also inserted.

As described above, the script prepared using the simple image information in a low-speed system such as a personal computer is input to a high-speed system, so that the moving image information and the voice information of the script can be produced using the original three-dimensional image information.

Incidentally, the parts information can be used also for other programs, and an environment must also be constructed in which the parts information are stored in a large-capacity storage device and collectively managed for reuse. The reuse of the parts information is expected to reduce the program production cost further.

With the future improvement of the performance of the personal computer, storyboards may become able to be produced also by the personal computer based on the detailed image information.

BEST MODE FOR CARRYING OUT THE INVENTION

A video information producing device according to a best mode for carrying out the invention will be explained in detail below with reference to the drawings.

Figure 1:
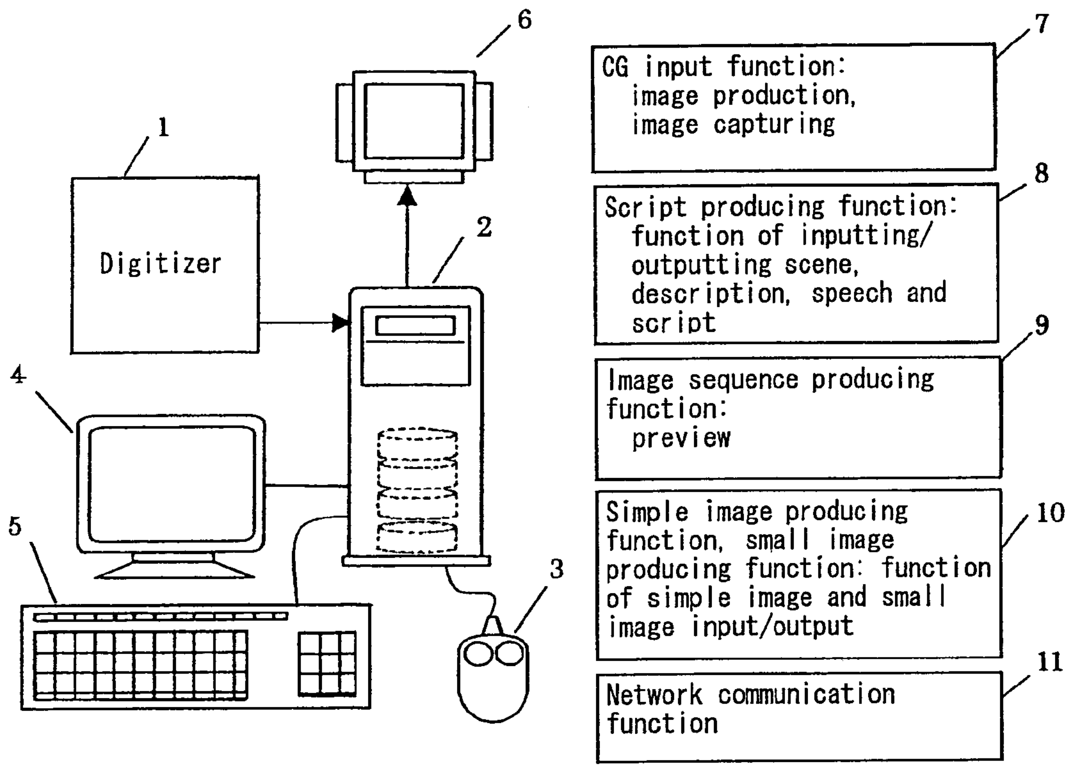
FIG. 1 is a diagram for explaining an example of a high-speed computer system configuration of a video information producing device according to a best mode for carrying out the invention.

Referring to FIG. 1, a configuration of a high-speed computer system of the video information producing device will be explained. A digitizer 1 is a three-dimensional image information input device for inputting the three-dimensional image information from an actual object or a photograph.

A high-speed computer body 2 has a single or a plurality of high-speed processors and is a computer having a large-capacity storage function.

A mouse 3 and a keyboard 5 as operating devices are for operating the high-speed computer body 2.

A CRT 4 making up a display device is for displaying the information of the high-speed computer body 2. A monitor TV 6 making up a display device, on the other hand, is for displaying the image output from the high-speed computer body 2.

The high-speed computer body 2 is included in a processing device. In this case, the mouse 3, the keyboard 5, the CRT 4 and the monitor TV 6 can also be included in the processing device.

The component parts making up the processing device may be configured as either an integral unit or separate units, and may transmit/receive information to and from each other by cable or radio.

A CG input function 7 indicates that the high-speed computer body 2 has a function of producing an image and capturing the image from the digitizer 1.

A script producing function 8 indicates that the high-speed computer body 2 has a function of inputting/outputting a script configured of a scene frame, a scene description frame and a speech frame.

A moving image producing function 9 indicates that the high-speed computer body 2 has a function of producing a moving image as designated by the script and a function of visual check (preview).

A simple image producing function and a small image producing function 10 indicate that the high-speed computer body 2 has a function of producing a small image used for preparing a script and a function of producing a simple image used for preview.

A simple image/small image input/output function 10 indicates that the high-speed computer body 2 has a function of input/output with other computers through a network communication function 11.

The network communication function 11 indicates the availability of a function of communication with other high-speed computers or personal computers.

Figure 2:
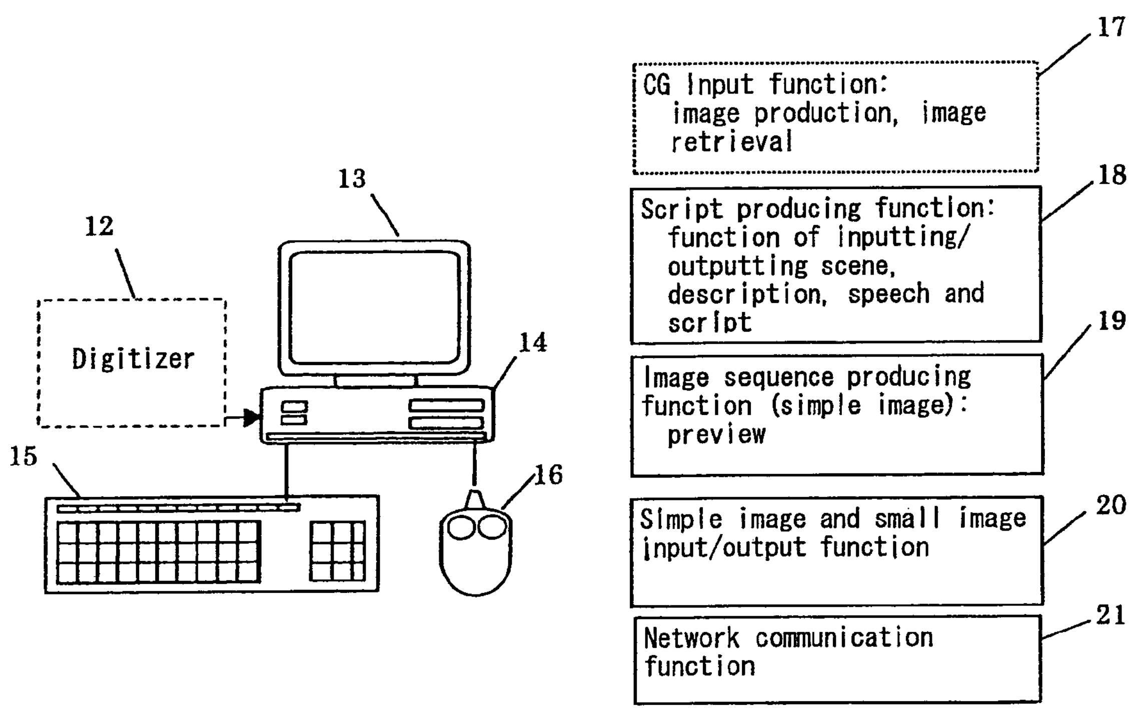
FIG. 2 is a diagram for explaining an example of a system configuration with a personal computer based on a video information producing device according to a best mode for carrying out the invention.

With reference to FIG. 2, a system configuration of a personal computer of the video information producing device will be explained. A digitizer 12 is a three-dimensional image information input device for inputting three-dimensional image information from an actual object or photograph (real image).

The digitizer 12 is defined by dashed line to indicate that this function is executed normally by the high-speed computer shown in FIG. 1 but not by a personal computer system.

A CRT 13 making up a display device displays the display information from a personal computer body 14. The personal computer body 14 has built therein a processor and a storage unit. A keyboard 15 and a mouse 16 making up operating devices are for operating the personal computer body 14.

In addition to the personal computer body 14 which is included in the processing device, the mouse 16, the keyboard 15 and the CRT 13 can also be included in the processing device. These component parts making up the processing device may be configured either integrally or as independent members, and can transmit/receive information between them either by cable or by radio.

A CG input function 17 indicates that the personal computer body 14 has a function of producing a three-dimensional CG image or inputting three-dimensional image information by means of the digitizer 12 from an object or a photograph.

The digitizer 12 is defined by dashed line for indicating that this function is normally executed by the high-speed computer shown in FIG. 1 and used by inputting information by means of a simple image/small image input/output function 20.

A script producing function 18 indicates that the personal computer body 14 has a function of inputting/outputting a script configured of a scene frame, a scene description frame and a speech frame.

A moving image producing function 19 indicates that the personal computer body 14 has a function of producing and previewing a moving image based on a simple image.

The simple image/small image input/output function 20 indicates that the personal computer body 14 has the function of inputting the simple image/small image produced by the high-speed computer shown in FIG. 1 or a function of outputting the simple image/small image stored.

A network communication function 21 indicates that the personal computer 14 has a function of communicating with other personal computers or high-speed computers.

Figure 3:
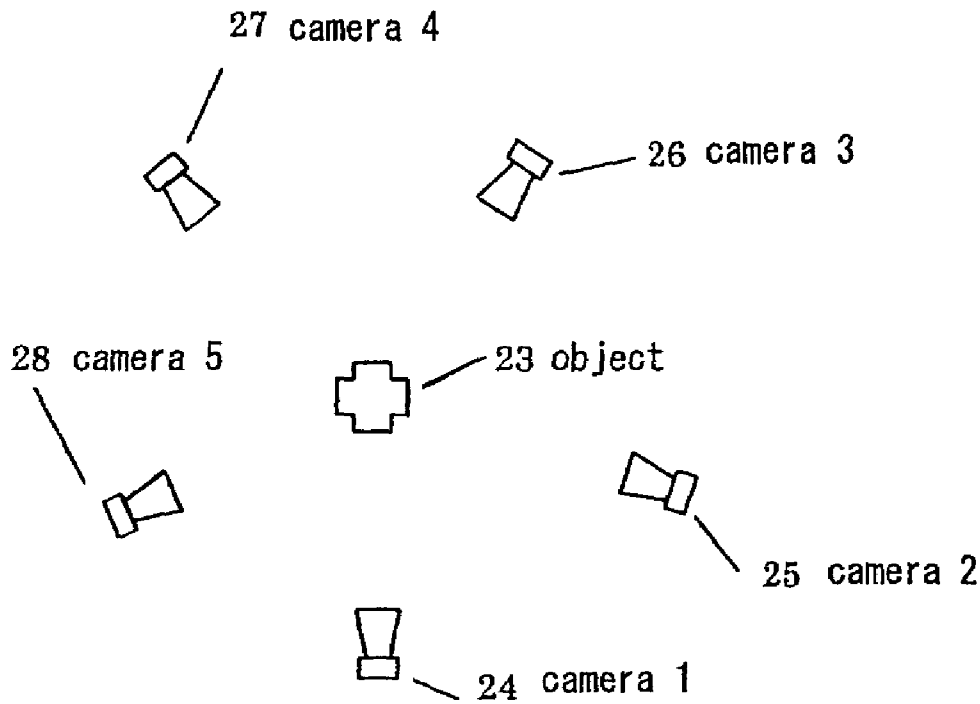
FIG. 3 is a diagram for explaining an example of a no-contact three-dimensional digitizer of a video information producing device according to a best mode for carrying out the invention.

FIG. 3 shows an example of a no-contact three-dimensional digitizer. An object 23 is imaged simultaneously by five cameras including a first camera 24, a second camera 25, a third camera 26, a fourth camera 27 and a fifth camera 28. This information is calculated thereby to produce the three-dimensional image information of the object 23.

The steps of the object are calculated from the images taken from two different directions. This process is executed by all of adjacent cameras. In the drawing, the mechanism for capturing the image of each camera into the high-speed computer body 2 is not shown.

Figure 4:
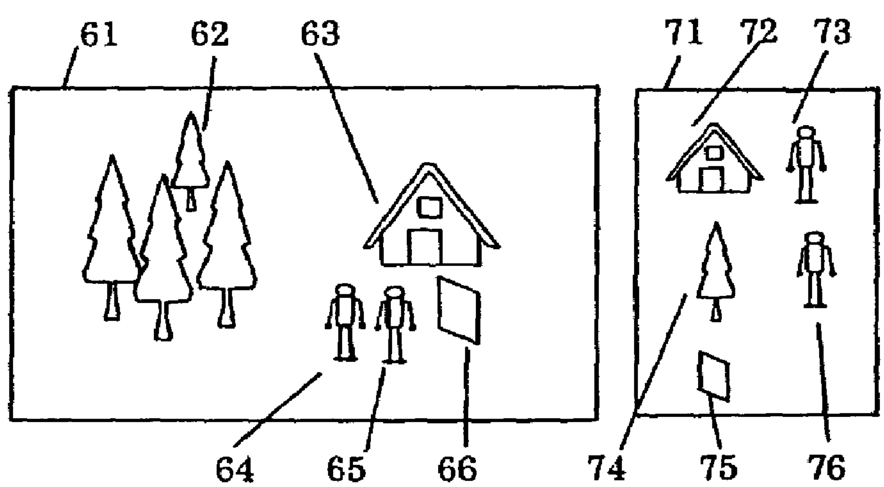
FIG. 4 is a diagram for explaining the scene production as an example of operation of a video information producing device according to a best mode for carrying out the invention.

With reference to FIG. 4, the scene production will be explained as an example of the operation of the video information producing device. A small image frame 71 displays a small image representing the three-dimensional image information. A small image 72 shows a house, a small image 73 a person A, a small image 74 a tree, a small image 75 a signboard and a small image 76 a person B.

A scene frame 61 indicates a scene. Trees 62 are formed of the small images 74 attached by the drag-and-drop operation.

In the process, the small image 74 remains as it is in the small image frame 71, and duplicated small images are attached. A house 63 is the small image 72 attached, a person A 64 the small image 76 attached, the person B 65 the small image 73 attached, and a signboard 66 the small image 75 attached.

The small images are attached in the scene frame 61 in such a manner as to involve individual images with a proper noun or the like to identify each person on the scene rather than entities of three-dimensional image information such as the persons A and B.

For fine adjustment of the direction, size and position of the small images attached, each small image is double-clicked to display three-dimensional image information based on the simple image information at the position of the particular small image. At the same time, a pull-down menu or the like is displayed nearby. In this way, the fine adjustment of size, rotation, distance and lateral direction is made possible. At the end of the pull-down menu (example), the small image display is restored from the three-dimensional real image display.

Figure 5:
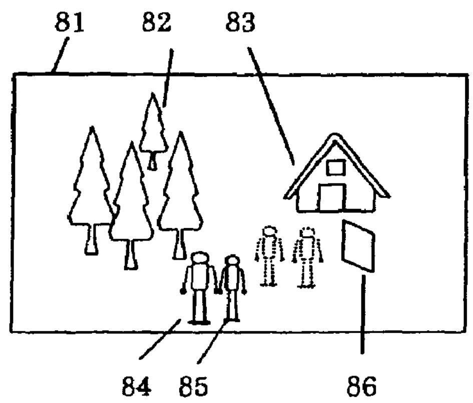
FIG. 5 is a diagram for explaining the scene duplication and the movement of persons as an example of operation of a video information producing device according to a best mode for carrying out the invention.

With reference to FIG. 5, an example of the duplication of a scene and a moving person will be explained as an example of operation of the video information producing device. A scene frame 81 is a direct duplication of the scene frame 61 with small images of persons and the like attached thereon. Small images 82, 83, 86 are the very duplications.

The small image 64 is moved to the small image 84, and the small image 65 to the small image 85. The small images defined by dashed lines indicate the positions before movement. For detailed setting of the small images 84, 85 after movement, the real image display by double click and the fine adjustment with a pull-down menu are used. In this case, the movement is involved, and therefore the items of mode of movement are also displayed in the pull-down menu, so that the mode of movement such as "walk" or "run" is also set.

By setting the time between the scene frame 61 and the scene frame 81, the moving image between the scene frame 61 and the scene frame 81 is produced.

Figure 6:
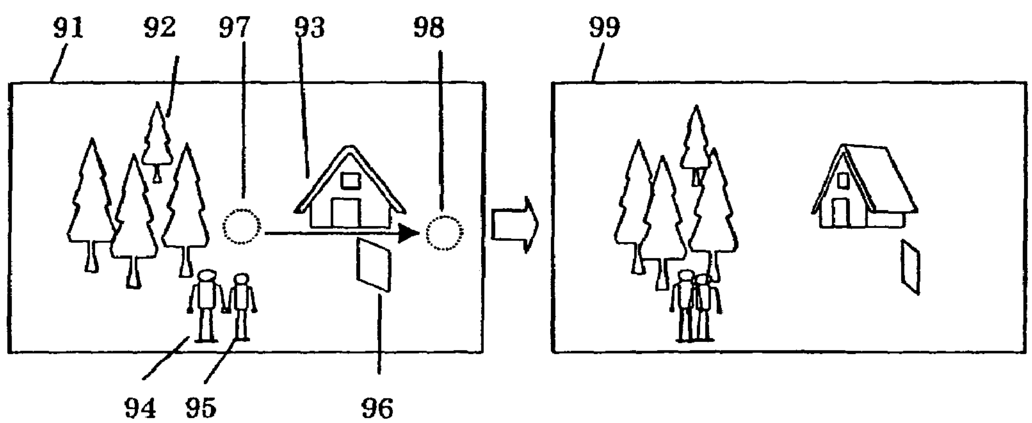
FIG. 6 is a diagram for explaining the scene duplication and the movement of a viewpoint as an example of operation of a video information producing device according to the best mode for carrying out the invention.

FIG. 6 shows an example of a duplication of a scene and the movement of a viewpoint. In FIG. 6, a scene frame 91 is a duplication of the scene frame 81 shown in FIG. 5.

Small images 92, 93, 94, 95, 96 of the scene frame 91 are not moved. A camera position 97 is located at the center of the scene. The camera position 97 is moved to a position 98 by the drag-and-drop operation.

Once the scene frame 91 is duplicated, a duplication is completed such as a scene frame 99 by the movement of the camera position. As long as a moving image is produced by designating the time between the scene frame 91 and the scene frame 99, a moving image is produced with the movement of the camera position.

Although only the camera position is moved between the scene frame 91 and the scene frame 99, the visual field (zoom) of the camera can also be changed as well as the person and the camera position.

Figure 7:
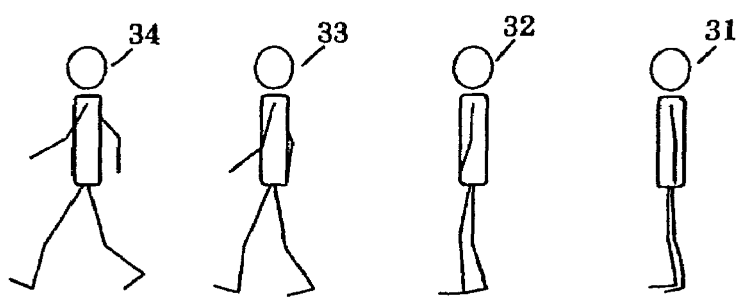
FIG. 7 is a diagram for explaining the form of motion and movement as an example of operation of a video information producing device according to a best mode for carrying out the invention.

FIG. 7 is a diagram for explaining the form of motion and movement. In FIG. 7, numeral 31 designates a view of a person in standing posture taken from the left side. A person 32 has both of his left hand and his right foot placed slightly forward with this left foot in touch with the ground. The foot in touch with the ground is fixed on the ground.

A person 33 is a slightly more advanced in motion, while a person 34 has his right foot in touch with the ground. The persons 31 to 34 represent a case in which a person walks. By carrying out this motion on left and right sides alternately, a walking motion is realized.

Figure 8:
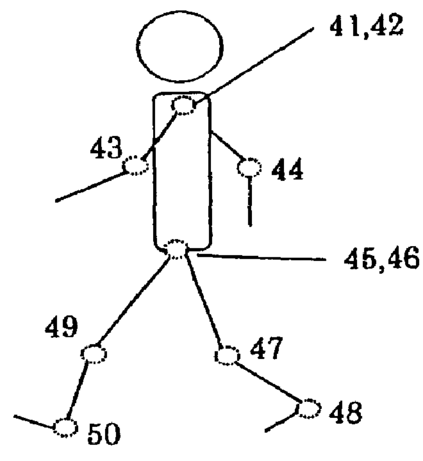
FIG. 8 is a diagram for explaining a skeleton as an example of operation of a video information producing device according to a best mode for carrying out the invention.

FIG. 8 shows a skeleton of a person. The skeleton is configured of joints as supporting points, which are connected by bones.

Joints 41, 42 are those of the shoulder and remain comparatively stationary when walking. A joint 43 is that of an arm and is connected with the joint 41 through a bone. Therefore, the distance between the joints 41 and 43 remains unchanged. A joint 44 is that of the right art. Similarly, joints 45 to 50 are those of the body.

The motion of a person is implemented by the movement of movable joints. In order to realize a complex motion and a more natural motion of a person in terms of CG, a person wearing an instrument for measuring the joint positions is moved to acquire the position information of the joints. This job is called motion capture, whereby the natural motion of an animal can be realized as well as that of the person.

The mode of movement is often a standard one. According to this invention, the standard motion is predetermined by acquiring the motion information by means of the motion capture or the like. In the case where a mode of movement is designated in the pull-down menu, the motion is implemented based on the motion information corresponding to the particular mode of movement.

For some programs, however, an expression with the mode of movement prepared as a standard motion is impossible, and the motion capture is required in many scenes. As usable modes of the motion capture, the mode of movement such as stealthy footsteps or shy motion is added to the pull-down menu.

Figure 9:
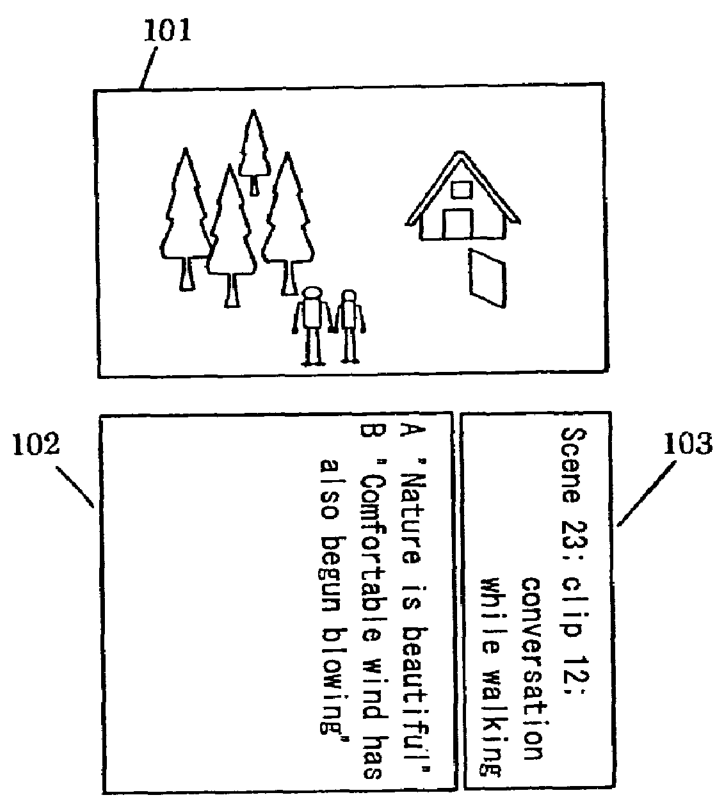
FIG. 9 is a diagram for explaining a storyboard as an example of operation of a video information producing device according to the best mode for carrying out the invention.

FIG. 9 shows an example of a storyboard. In FIG. 9, a scene frame 101 has small images attached. Speech 102 includes those of the persons A and B described. A scene description frame 103 contains the description of the scene number, the clip number, etc. The scene frame 101, the speech 102 and the scene description frame 103 make up one storyboard.

Figure 10:
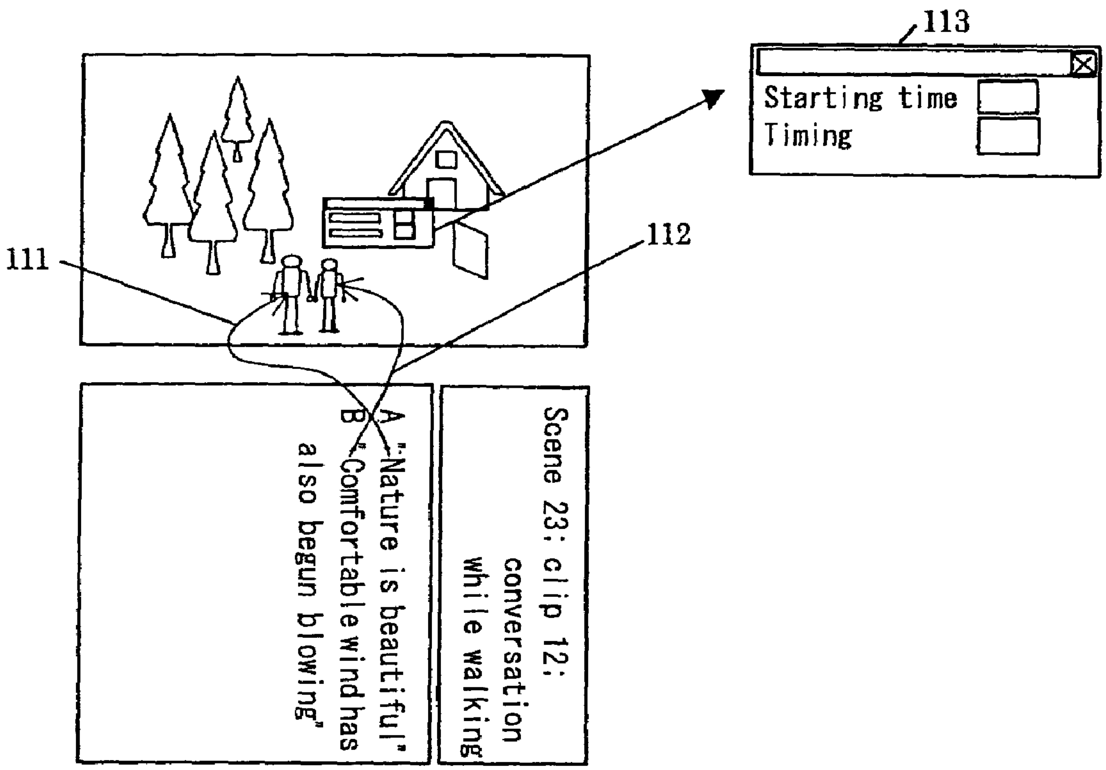
FIG. 10 is a diagram for explaining the attachment of speech as an example of operation of a video information producing device according to a best mode for carrying out the invention.

FIG. 10 is a diagram for explaining the attachment of speech. A attaching job 111 is carried out in such a manner that speech A is attached on a person on the scene by the drag-and-drop operation of the mouse, while a attaching job 112 is implemented by attaching speech B on another person on the scene.

At the time of attachment, a panel 113 is displayed nearby, so that the speech starting time from the initiation of the scene and the time of intermission before the next speech after the end of the preceding speech can be designated. The upper right panel 113 is an enlarged view of the panel displayed.

The attaching jobs enable a person to announce the speech. The person can be set either to move his/her mouth only or to issue voices by voice synthesis.

In the state of art, however, the utterance by voice synthesis fails to achieve the natural voice of the man but is limited, for the time being, to the voice of a robot or an animal other than a man. The utterance by man is produced by a (after-recording) technique in which the speech are issued and recorded while watching the moving image after completion of the moving image and matching voices with the moving image later.

In this way, one storyboard is completed. Upon receipt of a command for producing the next storyboard, the scene number is incremented and the speech are erased without changing the contents of the scene frame. The small images displayed in the scene frame are moved by the drag-and-drop operation or the like and the amount of movement of the particular parts is designated. The small images thus moved are double-clicked, so that the mode of movement such as "walk" or "run" is designated by the pull-down menu.

For producing a moving image (composed of a plurality of images) involving a motion for movement, the definition of the skeleton of parts, the motion capture, the correction of slide or the like sophisticated techniques are required for generating a natural motion. This technique, however, is not the gist of the invention.

Figure 11:
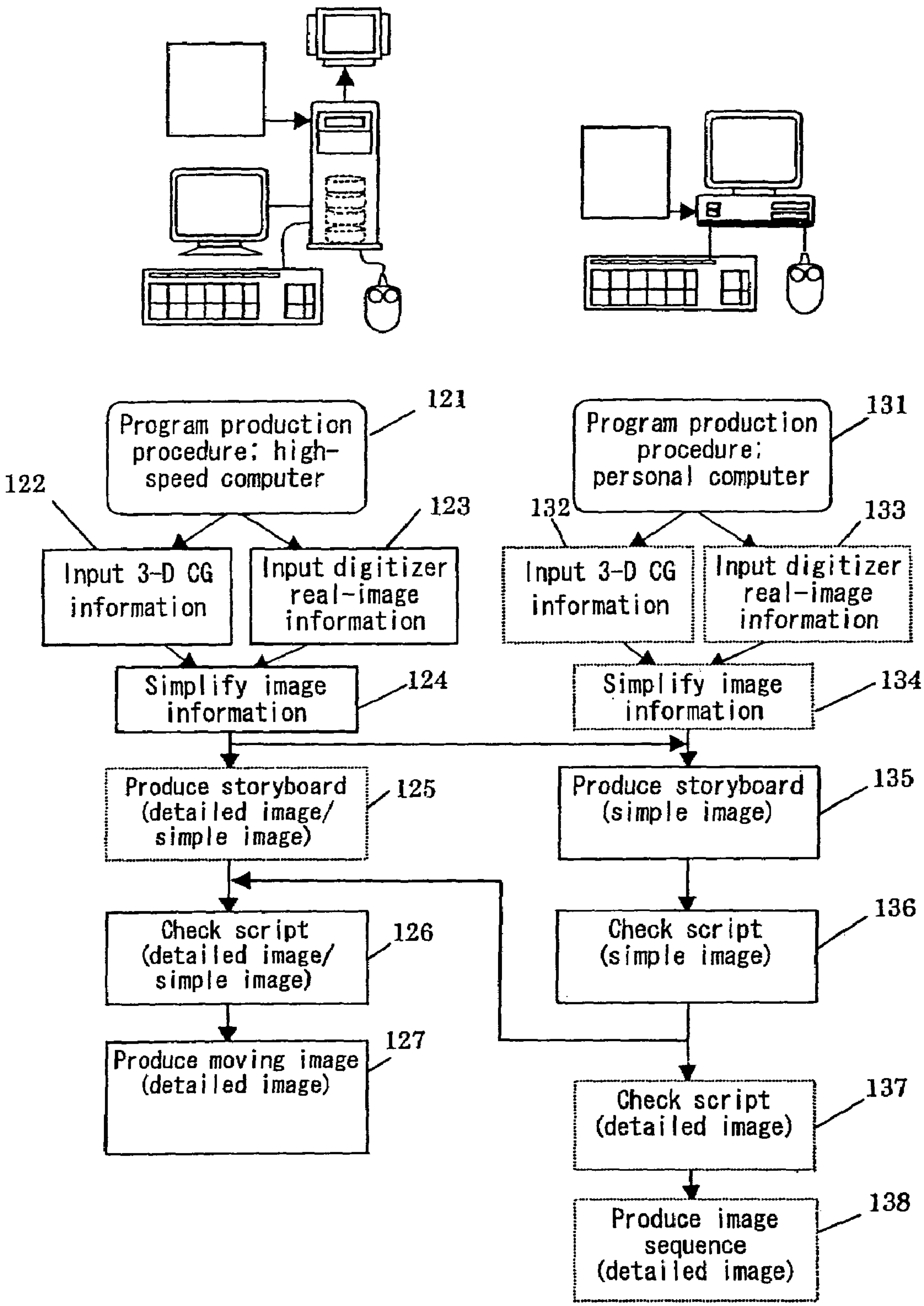
FIG. 11 is a diagram for explaining an example of functions of a high-speed computer and a personal computer in a video information producing device according to a best mode for carrying out the invention.

With reference to FIG. 11, the functions of the high-speed computer and the personal computer will be explained. A flowchart 121 represents the procedure for producing a program by a high-speed computer. The high-speed computer corresponds to a high-speed image information production device and the personal computer to a low-speed image information production device.

The three-dimensional CG information input 122 is the job for inputting the CG information by use of the keyboard 5 and the mouse 3. The information thus input are stored as three-dimensional image information.

Digitizer real image information input 123 is the job for inputting three-dimensional image information from a real object using a no-contact three-dimensional digitizer or the like shown in FIG. 3. The information thus input is stored as three-dimensional image information.

Image information simplification 124 is a job for simplifying the stored three-dimensional image information and storing it as simple image information thereby to produce and store a small image.

Storyboard production 125 is a job for constructing a scene by attaching small images on a scene frame, duplicating the scene, designating the movement and the mode of movement of small images, describing a scene and speech and attaching the speech.

The three-dimensional image information used in this case may be either the simple image information or the detailed image information. This job frame is indicated by dashed line, which indicates the job is normally performed by the personal computer.

Script check 126 is a job for producing, viewing and confirming the moving image by the detailed image information making up non-simple image information. Moving image production 127 is a job for producing a moving image based on the detailed image information from the script confirmed.

A flowchart 131 shows the procedure for producing a program by a personal computer.

Three-dimensional CG information input 132 is a job for inputting the CG information by use of the keyboard 15 and the mouse 16. The information thus input are stored as three-dimensional image information.

Digitizer real image information input 133 is a job for inputting three-dimensional image information from a real object using a no-contact three-dimensional digitizer or the like shown in FIG. 3. The information thus input is stored as three-dimensional image information. These jobs are carried out normally by a high-speed computer.

Image information simplification 134 is a job for simplifying the stored three-dimensional image information, storing it as simple image information, and producing and storing a small image. This job is also carried out normally by a high-speed computer.

Storyboard production 135 is a job for configuring a scene by attaching small images on a scene frame, designating a scene duplication and the movement and the mode of movement of small images, explaining the scene and describing the speech and attaching the speech. This job is carried out on the personal computer using the simple image information.

Script check 136 is a job for producing the motion from the script, viewing and checking it using the simple image information.

Script check 137 is a job for producing a moving image and viewing and checking it from the script using the detailed image information. This job is normally carried out by a high-speed computer but may alternatively be executed by a personal computer at the sacrifice of considerable time consumption.

Moving image production 138 is a job for producing a moving image from the script using the detailed image information. This job is normally carried out by a high-speed computer.

The arrow from the image information simplification 124 to the storyboard production 135 indicates that the simple image information produced by the high-speed computer is transferred by the personal computer and the storyboard is produced on the personal computer.

The arrow from the script check 136 to the script check 126 indicates that the script produced by the personal computer is transferred to the high-speed computer and a moving image is produced with the detailed image information.

With the video information producing device described above, a tool for producing the script and the storyboard on the computer is produced and by combining the storyboard with the existing CG technique and the voice synthesis technique, the effects of the following items can be realized.

1. The three-dimensional image information of an existing object or person is captured, and a moving image of the existing object or person can be produced using the CG technique. Thus, the time binding an entertainer can be remarkably reduced while at the same time considerably reducing the program production cost by eliminating the need of large props utilizing natural landscape.

2. The use of the CG technique makes it possible to freely produce a moving image of a dangerous motion of an existing entertainer such as falling off from a high place or an unrealistic motion such as jumping over a wide river in one breath.

3. A program can be produced on the desk by producing a script and a storyboard on the computer and producing and previewing a moving image from the storyboard. As a result, the program production cost can be reduced.

4. By producing the simple image information of three-dimensional image information, a program can be produced with a low-speed computer like a personal computer. Thus, the script completed on the personal computer is transferred to the high-speed computer, so that a moving image can be produced with the detailed image information on the high-speed computer.

5. A moving image of moving a mouth by speech as well as the motion of movement can be produced.

6. Voices can be synthesized with the speech.

With the video information producing device described above, three-dimensional image information of an existing object, an existing person, etc. are captured and a moving image of the existing object or person can be produced using the computer graphics technique. As a result, the time binding an entertainer can be considerably reduced. Also, the use of three-dimensional image information of an existing object as a background eliminates the large props, or otherwise reduces the program product cost remarkably.

Also, based on the real-image three-dimensional image information of an entertainer, the moving image information can be produced in a desired situation within the scope of the computer graphics technique. As a result, dangerous motions such as jumping down from a high place or an unexpected, unrealistic motions such as jumping over a wide river in a breath can be produced freely as a moving image.

Further, simple image information is produced by a high-speed image information production device and delivered to a low-speed image information production device. In this way, storyboards and a script are produced by the low-speed image information production device, and based on this script, the high-speed image information production device produces a moving image with the detailed image information. Thus, the main work can be carried out on a low-speed image information production device such as a personal computer. As a result, a moving image of an existing part can be produced both easily and efficiently at low cost.

INDUSTRIAL APPLICABILITY

This invention is applicable to the video information producing device for producing a moving image by the computer graphics technique.

The invention claimed is:

1. A video information producing device comprising:

a processor;

an operating device for operating the processor; and a display device for displaying information of the processor;

wherein the processor performs a function of storing real-image three-dimensional image information, a function of generating small image information from the real-image three-dimensional image information read from the storage function, a function of storing the real-image three-dimensional image information and the small image information as associated with each other, a function of displaying a scene frame for expression of three-dimensional space, a function of displaying a small image of the small image information in a small image frame, a function of selecting the small image in the small image frame on a screen and moving and attaching the small image at a desired position in the scene frame, a function of storing information for arrangement of the attached small image in the scene frame, a function of correcting the form of expression of the small image displayed in the scene frame internally of the scene frame, a function of changing the form of motions of the small image displayed in the scene frame internally of the scene frame, a function of updating the arrangement information of the small image after the correction or after the change, a function of generating a temporal series of moving image information by calculating the motion change from the small image before the change to the small image after the change in the scene frame, and a function of storing the generated moving image information.

2. A video information producing device comprising:

an input device for inputting real-image three-dimensional image information; and a processing device for processing the three-dimensional image information from the input device;

wherein the processing device performs a function of storing the real-image three-dimensional image information, a function of generating small image information from the real-image three-dimensional image information read from the storage function, a function of storing the real-image three-dimensional image information and the small image information as associated with each other, a function of displaying a scene frame for expression of three-dimensional space, a function of displaying a small image of the small image information internally of the small image frame, a function of selecting the small image in the small image frame on a screen and moving and attaching the small image at a desired position in the scene frame, a function of storing information of arrangement of the attached small image in the scene frame, a function of correcting the form of expression of the small image displayed in the scene frame internally of the scene frame, a function of changing the form of motions of the small image displayed in the scene frame internally of the scene frame, a function of updating the arrangement information of the small image after the correction or after the change, a function of generating a temporal series of moving image information by calculating the motion change from the small image before the change to the small image after the change in the scene frame, and a function of storing the generated moving image information.

3. A video information producing device according to claim 2, wherein the moving image information generating function of the processing device includes functions of;

duplicating the scene frame with the small image attached thereto, moving the small image in the duplicated scene frame internally of the scene frame, designating movement mode of the small image, designating motion time of motion from the small image before duplication to the small image after duplication in the scene frame, and controlling generation of a temporal series of the moving image information for the motion change from the small image before duplication to the small image after duplication in such a manner as to generate the moving image information for the designated motion time.

4. A video information producing device according to claim 3, wherein the processing device further includes a function of changing a visual field in the three-dimensional space of the duplicated scene frame and a function of controlling generation of a temporal series of the moving image information for the motion change from the small image before duplication to the small image after duplication in such a manner as to generate the moving image information with the change of the visual field added thereto.

5. A video information producing device according to claim 2, wherein the processing device further includes a function of changing a visual field in the three-dimensional space of the duplicated scene frame and a function of controlling generation of a temporal series of the moving image information for the motion change from the small image before duplication to the small image after duplication in such a manner as to generate the moving image information with the change of the visual field added thereto.

6. A video information producing device according to claim 2, wherein the processing device further includes a function of displaying a scene description frame for describing a scene of the scene frame together with the scene frame, a function of displaying a speech frame for describing a speech in the scene of the scene frame, and a function of attaching the speech described in the speech frame to a small image selected in the scene frame.

7. A video information producing device according to claim 6, wherein the processing device further includes a function of designating timing of generating the speech described in the speech frame and a function of synthesizing and outputting a voice of the corresponding speech at the designated timing.

8. A video information producing device according to claim 7, wherein the processing device further includes a function of controlling the small image indicating a mouth for pronouncing movement in synchronism with the output timing of the speech.

9. A video information producing device according to claim 6, wherein the processing device further includes a function of collectively managing a plurality of storyboards each making up a unit storyboard including the information for describing one scene configured of a scene frame, a scene description frame and a speech frame.

10. A video information producing device according to claim 9, wherein the processing device further includes a function of designating one of a plurality of the managed scripts each including a plurality of storyboards and description of a unit broadcast program and upon designation of a specific storyboard, displaying the moving image information from the storyboard and unless so designated, displaying the moving image information each from the beginning, and a function of outputting the voice information as required.

11. A video information producing device according to claim 2, wherein the processing device is so configured that a high-speed image information production device and a low-speed image information production device collaborate with each other, wherein the high-speed image information production device has a function of producing simple image information with a part of the image information deleted from the real-image three-dimensional image information and transferring the data to the low-speed image information production device, wherein the low-speed image information production device has a function of executing the process of each function for the simple image information transferred thereto as data, producing a script based on the simple image information and transferring the data to the high-speed image information production device, and wherein the high-speed image information production device has a function of converting the script based on the simple image information transferred thereto as data into a script based on the real-image three-dimensional image information constituting the detailed image information.

12. A video information producing device according to claim 2, wherein the processing device includes a computer body having a function of storing and processing information, an operating device for operating the computer body and a display device for displaying information from the computer body, and wherein the computer body executes each of the functions in accordance with the operation of the operating device and causes required information to be displayed on the display device.

* * * * *

UNITED STATES PATENT AND TRADEMARK OFFICE

CERTIFICATE OF CORRECTION

PATENT NO. : 7,002,584 B2 
DATED : February 21, 2006
INVENTOR(S) : Kenji Saito

It is certified that error appears in the above-identified patent and that said Letters Patent is hereby corrected as shown below:

Title page,
Item (22), PCT Filed, change "Oct. 11, 2001" to -- Oct. 22, 2001 --.

Signed and Sealed this

Twenty-third Day of May, 2006

JON W. DUDAS
*Director of the United States Patent and Trademark Office*